Patented July 23, 1940

2,208,925

UNITED STATES PATENT OFFICE 2,208,925

MONOAZO DYESTUFFS INSOLUBLE IN WATER

Ernst Fischer, Offenbach-on-the-Main, Germany, assignor to General Aniline & Film Corporation, a corporation of Delaware No Drawing. Application May 3, 1939, Serial No. 271,505. In Germany May 5, 1938

5 Claims. (Cl. 260—203)

The present invention relates to monoazo dyestuffs insoluble in water; more particularly it relates to dyestuffs of the following general formula:

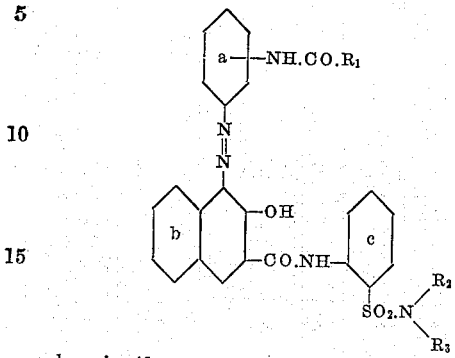

wherein the group —NH.CO.R₁ stands in meta- or para-position to the azo-group, the benzene radical a may contain as further substituents alkyl-, alkoxy-groups or halogen, R₁ means an alkyl-, aralkyl-, aryl- or a hydroaromatic radical, R₂ and R₃ represent alkyl-, aralkyl-, aryl- or hydroaromatic radicals which may be connected to form a heterocyclic ring system, and wherein the naphthalene radical may contain as substituents in b an alkoxy-group or halogen and the benzene radical c may contain alkyl-, alkoxy-groups or halogen atoms.

I have found that valuable monoazo dyestuffs are obtained by coupling the diazo-compounds from amines of the general formula

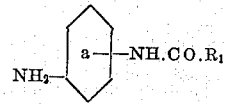

wherein the group —NH.CO.R₁ stands in meta- or para-position to the amino-group, the benzene radical a may contain as further substituents alkyl, alkoxy-groups or halogen atoms, and wherein R₁ means an alkyl, aralkyl, aryl or a hydroaromatic radical, with arylides of 2-hydroxynaphthalene-3-carboxylic acid of the following general formula:

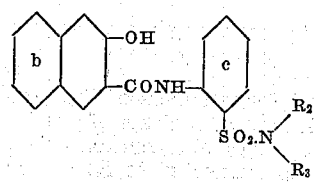

wherein R₂ and R₃ represent alkyl, aralkyl, aryl or hydroaromatic radicals, which may be connected to form a heterocyclic ring system, and wherein the naphthalene radical may contain as substituents in b an alkoxy-group or halogen and the benzene radical c may contain alkyl- or alkoxy-groups or halogen atoms, only such dyestuff components being used as do not contain any group lending solubility in water.

The new dyestuffs yield red to blue shades of good properties of fastness. They are insoluble in water, but very easily soluble in many organic solvents, for instance, hydrocarbons, alcohols, esters, ketones and, therefore, can be used for coloring these solvents as well as the lacquers prepared by means of these solvents, for instance, nitro- or acetyl-cellulose lacquers, films or plastic masses. They are also especially suitable for coloring varnishes, candles and fats. Owing to the different substituents present in the dyestuffs the suitability of the organic solvents named varies, but the most suitable solvents may easily be ascertained by experiment.

The dyestuffs obtainable according to the present invention are distinguished from the dyestuffs described in French Patent 810,699, which contain the sulfamide-group in the arylide radical of the coupling component in meta-position to the —CONH-group, by an essentially better solubility in organic solvents, so that they are more suitable for coloring substances of the above-named kind.

The following examples serve to illustrate the invention, but they are not intended to limit it thereto; the parts are by weight:

(1) 10.5 parts of 1-amino-2.5-dimethoxy-4-acetaminobenzene are diazotized in the usual manner. Thereupon sodium acetate is added to the diazo-solution in order to bind the mineral acid in excess and the diazo-solution is then stirred into a solution of 22.7 parts of 2.3-hydroxynaphthoyl- 1'-aminobenzene- 2'-(sulfonyl-n-dibutylamine) in dilute caustic soda solution. When the coupling is complete, the dyestuff is filtered with suction, washed well and dried. It is a violet powder which dissolves easily in butyl alcohol, butyl acetate and other organic solvents and colors cellulose ester lacquers as well as candles and fats, vivid violet tints of good properties of fastness. The dyestuff corresponds with the following formula:

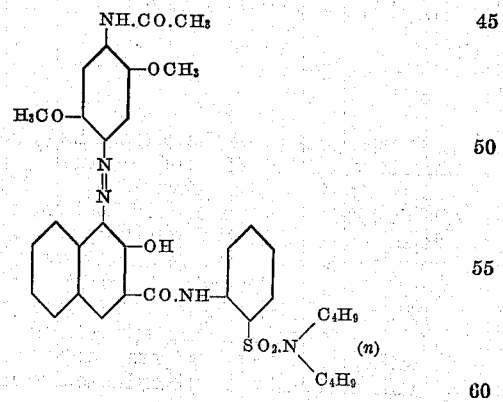

(2) 10.6 parts of 1-amino-4-benzoylaminobenzene are diazotized in the usual manner. The diazo-solution which has been made neutral to Congo paper is stirred into a solution of 19.9 parts of 2.3-hydroxy-naphthoyl-1'-aminobenzene-2'-(sulfonyl-diethylamine) in dilute caustic soda solution. The dyestuff obtained is filtered with suction, well washed and dried. It dissolves easily in ethyl acetate, acetone, xylene and other organic solvents and colors nitro- and acetyl-cellulose lacquers and also varnishes vivid bluish-red tints of good fastness to light.

(3) From the diazo-compound from 12 parts of 1-amino-2.4-dimethyl-5-benzoylaminobenzene and 22.7 parts of 2.3-hydroxynaphthoyl-1'-amino-benzene-2'-(sulfonyl-n-dibutylamine) a red dyestuff is obtained in the manner described in Examples 1 and 2. It dissolves easily in organic solvents and colors cellulose ester lacquers red tints of good fastness to light.

(4) By using in Example 1 instead of 10.5 parts of 1- amino -2.5- dimethoxy-4-acetaminobenzene 17.5 parts of 1-amino-2.5-diethoxy-4-(alpha) naphthoylaminobenzene, a dyestuff of similarly good properties of fastness is obtained which also colors the various organic solvents and the lacquers prepared therewith violet tints.

The following table indicates a number of other monoazo dyestuffs obtainable by the invention, which are likewise easily soluble in the solvents suitable for the purposes in question and have good properties of fastness:

I claim:
1. The water-insoluble monoazo dyestuffs of the following general formula:

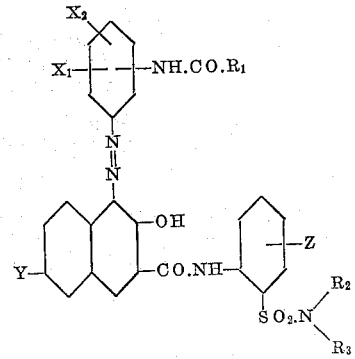

wherein the group —NH.CO.R₁ stands in one of the positions meta and para to the azo-group, $X_1$ and $X_2$ stand for members of the group consisting of hydrogen, alkyl, alkoxy and halogen, $R_1$ stands for a member of the group consisting of methyl, benzyl, radicals of the benzene and naphthalene series and a hydroaromatic radical, $R_2$

| Diazo-compound from— | Coupled with— | Shade |
|---|---|---|
| (1) 1-amino-2.5-dimethoxy-4-benzoylaminobenzene | 2,3-hydroxynaphthoyl-1'-amino— Benzene-2'-(sulfonyl-N-benzyl-cyclohexylamine) | Violet. |
| (2) 1-amino-2.4-dimethoxy-5-benzoylaminobenzene | Benzene-2'-(sulfonyl-n-dibutylamine) | Red-violet. |
| (3) 1-amino-2.5-diethoxy-4-benzoylaminobenzene | do | Violet. |
| (4) 1-amino-2.5-diethoxy-4-benzoylaminobenzene | Benzene-2'-(sulfonyl-N-(n-)butyl-1''-amino-2''-methylbenzene). | Do. |
| (5) 1-amino-2.5-diethoxy-4-(4'-ethoxybenzoyl-)aminobezene | Benzene-2'-(sulfonyl-N-(n-)butyl-1''-amino-2''-methylbenzene). | Do. |
| (6) 1-amino-3-benzoylaminobenzene | Benzene-2'-(sulfonyl-diethylamine) | Red. |
| (7) 1-amino-4-methyl-5-benzoylaminobenzene | do | Yellowish-red. |
| (8) 1-amino-2-methoxy-5-chloro-4-benzoylaminobenzene | Benzene-2'(sulfonyl-n-dibutylamine) | Red-violet. |
| (9) 1-amino-2-chloro-5-methoxy-4-benzoylaminobenzene | do | Do. |
| (10) 1-amino-2-methoxy-5-benzoylaminobenzene | do | Bordeaux. |
| (11) 1-amino-2-methoxy-5-methyl-4-benzoylaminobenzene | do | Red-violet. |
| (12) 1-amino-2.5-diethoxy-4-phenacetylaminobenzene | do | Violet. |
| (13) 1-amino-3.5-dichloro-4-hexahydrobenzoylaminobenzene | Benzene-2'-(sulfonyl-N-benzyl-cyclohexylamine) | Brown-orange. |
| (14) 1-amino-2.4-dimethyl-5-benzoylaminobenzene | Benzene-2'-(sulfonyl-dibenzylamine) | Red. |
| (15) 1-amino-4-benzoylaminobenzene | 4'-methyl-benzene-2'-(sulfonyl-dimethylamine) | Do. |
| (16) Do | 4'-methylbenzene-2'-(sulfonyl-N-benzyl-phenylamine) | Do. |
| (17) Do | 4'-methylbenzene-2'-(sulfonyl-dicyclohexylamine) | Do. |
| (18) 1-amino-2.5-diethoxy-4-benzoylaminobenzene | 4'-methoxybenzene-2'-(sulfonyl-N-ethyl-cyclohexylamine). | Violet. |
| (19) 1-amino-2.5-diethoxy-4-benzoylaminobenzene | 4'-methoxybenzene-2'-(sulfonyl-N-methyl-benzylamine) | Do. |
| (20) 1-amino-2.4-dimethyl-5-benzoylaminobenzene | 4'-ethoxybenzene-2'-(sulfonyl-N-piperidine) | Red. |
| (21) Do | 4'-chlorobenzene-2'-(sulfonyl-diphenylamine) | Do. |
| (22) 1-amino-2.4-dimethyl-5-benzoylaminobenzene | 4'-methyl-6'-chlorobenzene-2'-(sulfonyl-n-dibutylamine) | Do. |
| (23) 1-amino-4-benzoylaminobenzene | Benzene-2'-(sulfonyl-N-carbazole) | Do. |
| (24) Do | Benzene-2'-(sulfonyl-N-ethyl-1'''-naphthylamine) | Do. |
| (25) 1-amino-2.5-diethoxy-4-benzoylaminobenzene | 4'-methylbenzene-2'-(sulfonyl-dimethylamine) | Violet. |
| (26) 1-amino-2.5-diethoxy-4-benzoylaminobenzene | 6-methoxy-2,3-hydroxynaphthoyl— 1'-aminobenzene-2'-(sulfonyl-n-dibutylamine) | Blue. |
| (27) 1-amino-2.5-diethoxy-4-benzoylaminobenzene | 6-bromo-2.3-hydroxynaphthoyl— 1'-aminobenzene-2'-(sulfonyl-n-dibutylamine) | Reddish-blue. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

and $R_3$ stand for members of the group consisting of alkyl, benzyl, radicals of the benzene and naphthalene series and hydroaromatic radicals which may be connected to form a heterocyclic ring system, Y stands for a member of the group consisting of hydrogen, alkoxy and halogen, and Z stands for a member of the group consisting of hydrogen, alkyl, alkoxy and halogen, being insoluble in water, but very easily soluble in organic solvents and yielding red to blue shades of good properties of fastness.

2. The water-insoluble monoazo dyestuffs of the following general formula:

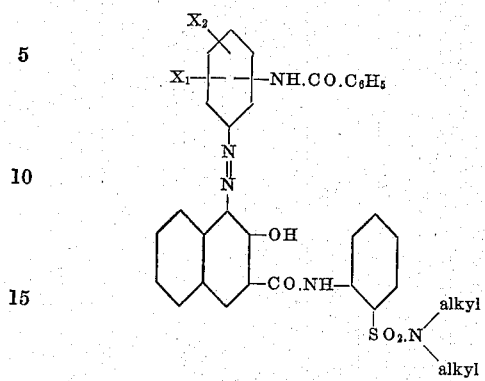

wherein the group —NH.CO.C$_6$H$_5$ stands in one of the positions meta and para to the azo-group, X$_1$ and X$_2$ stand for members of the group consisting of hydrogen, alkyl, alkoxy and halogen, being insoluble in water, but very easily soluble in organic solvents and yielding red to blue shades of good properties of fastness.

3. The water-insoluble monoazo dyestuff of the following formula:

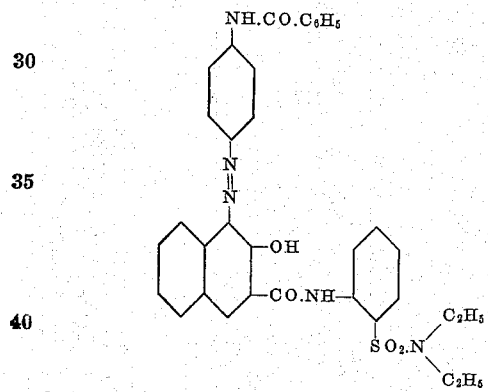

being a red powder which dissolves easily in organic solvents, such as butyl alcohol, butyl acetate, acetone, xylene and colors, for instance, cellulose ester lacquers red tints of good properties of fastness.

4. The water-insoluble monoazo dyestuff of the following formula:

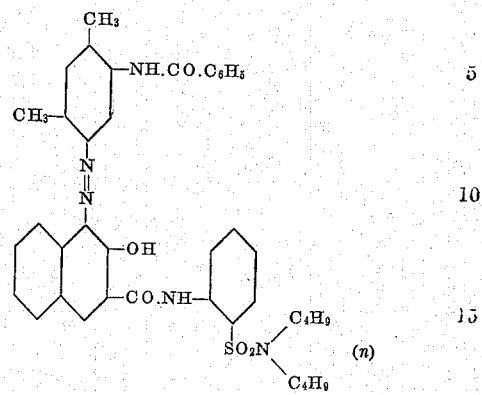

being a red powder which dissolves easily in organic solvents, such as butyl alcohol, butyl acetate, acetone, xylene and colors, for instance, cellulose ester lacquers red tints of good properties of fastness.

5. The water-insoluble monoazo dyestuff of the following formula:

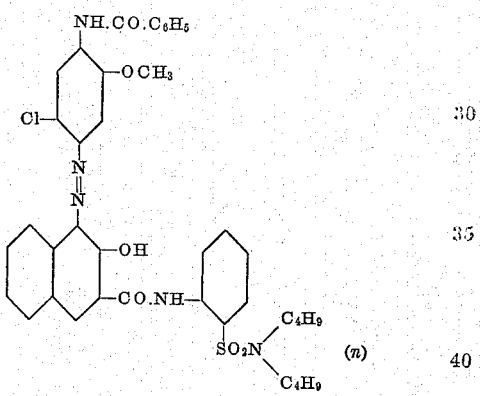

being a red-violet powder which dissolves easily in organic solvents, such as butyl alcohol, butyl acetate, acetone, xylene and colors, for instance, cellulose ester lacquers red-violet tints of good properties of fastness.

ERNST FISCHER.